Patented Nov. 4, 1941

2,261,177

UNITED STATES PATENT OFFICE 2,261,177

ZINC SULPHIDE PIGMENT

William I. Noonburg, Hayden Park, Del., assignor to E. I. du Pont de Nemours & Company, Wilmington, Del., a corporation of Delaware No Drawing. Application April 27, 1938, Serial No. 204,610

7 Claims. (Cl. 106—293)

This invention relates to zinc-containing pigments, and more particularly to the production of improved light and weather-resistant zinc sulphide pigments.

Zinc sulphide pigments employable in paints and similar coating compositions exhibit a marked tendency to discolor or yellow. This is a very objectionable property because it seriously and adversely affects the utility of such pigments. These pigments are also prone to darken upon exposure to weathering influences, and particularly sunlight. Heretofore, various expedients have been resorted to with a view to overcoming these objectionable characteristics of prior zinc sulphide pigments, but none has proved completely satisfactory or successful.

It has been found that a stable, light and weather-resistant zinc sulphide pigment, free from objectionable yellowing or darkening, can be obtained and the present invention accordingly provides a novel method of treating such pigments, whereby such results are effected.

In accordance with this invention, a zinc compound, such as zinc sulphide, previously calcined to develop its pigmentary properties, is treated with a suitable protective agent, such as hydrated aluminum oxide, whereby the hydrous oxide becomes intimately associated with said pigment so as to effectively overcome and inhibit any tendency towards instability, yellowing, or darkening, which said pigment might otherwise exhibit upon subjection to light or weathering influences.

In adapting the invention to preferable practice, relatively small amounts of hydrated aluminum oxide are intimately associated with a zinc sulphide pigment, previously calcined to develop its pigment properties, by either adding the hydrate, after separate preparation, directly to the pigment, or precipitating the same thereon, while the pigment is maintained in aqueous slurry suspension. Thus, by conveniently adding, during agitation, a suitable quantity of a solution of aluminum sulphate, or a soluble aluminate, to an aqueous slurry of the pigment, and then slowly adjusting the pH value of the mixture within a range of about 5 to 8, through addition of an acidifying or neutralizing agent, precipitation of the insoluble hydrated aluminum oxide onto the pigment is effected. Specifically, when employing a soluble aluminate, the pH of the slurry may be gradually adjusted from about 6.5 to about 7.5 to induce precipitation by addition, during vigorous stirring, of an acidifying agent, such as aluminum sulphate. Should aluminum sulphate be employed as an aluminum hydrate source, following its addition to the agitated pigment slurry, a suitable alkaline metal hydroxide solution such as barium hydroxide, may be added to effect neutralization and precipitation. After the hydrous oxide has been precipitated, the slurry is filtered, the pigment dried and dry milled, and is ready for use. In effecting drying, temperatures not exceeding about 200° C. are preferably resorted to, and in no event are temperatures of a calcination order or in excess of about 250° C. employed. Temperatures of less than about 100° C. are also undesirable when the pigment is dried under normal atmospheric conditions. In resorting to temperatures of a drying order, conversion of the aluminum hydrate to its anhydrous form is avoided.

In instances where the hydrated aluminum oxide is separately prepared and then added to the zinc sulphide pigment, preparation of the hydrate may be effected by addition of a basic precipitant, such as an alkaline agent, to a solution of an aluminum salt, such as aluminum sulphate, during agitation. Precipitant addition is preferably continued until the pH of the mixture is adjusted to substantial neutralization. After precipitation of the hydrate, it is then washed free of soluble salts by any desirable means, such as through decantation, filtration, etc., complete drying of the precipitate being preferably avoided during such after treatment. An aqueous slurry or suspension of the purified product is then prepared and blended with a slurry or suspension of the zinc sulphide pigment. In order to insure uniform incorporation of the agent throughout the pigment, the mixture is thoroughly agitated, after which the treated pigment is filtered and dried in the same manner as when the aluminum hydrate is precipitated directly upon the pigment particles.

In order that the invention may be more clearly understood, the following examples are given in illustration:

Example I 65 grams of commercial sodium aluminate was dissolved in 1 liter of water and filtered. The resulting clear solution was added to 20 liters of pigment slurry containing 250 grams of calcined lithopone per liter. The pH was adjusted to 7.2 by the addition of a 10% solution of octodecahydrated aluminum sulfate, $Al_2(SO_4)_3.18 H_2O$, in water. The pigment suspension was then filtered, dried at 175° C. and dry milled by passage through a squirrel cage disintegrator, the product containing 1.8% of $Al(OH)_3$. When incorporated in standard flat wall paints and the paints spread on test panels and dried, it was found that after a period of approximately 2 months' exposure in a darkened room no tendency towards yellowing was exhibited. On the other hand, when a comparable test was made on a paint containing a similar but untreated pigment, yellowing became evident within two weeks' time and was very bad at the end of two months' time.

Example II 65 grams of commercial sodium aluminate was dissolved in 1 liter of water and filtered. The resulting clear solution was added to 20 liters of pigment slurry containing 250 grams of calcined zinc sulphide per liter. The pH was adjusted to 7.0 by the addition of sulphuric acid. The pigment suspension was then filtered, dried at 150° C. and dry milled by passage through a squirrel cage disintegrator, the product containing the equivalent of 1.2% Al(OH)$_3$. The resultant pigment was found to impart important yellowing resistance to paint films and the like when it was incorporated in conventional coating composition vehicles.

Example III 60,720 parts by weight of a calcined, wet milled zinc sulphide slurry containing 18,160 parts by weight of zinc sulphide was diluted with sufficient water to permit efficient stirring, the zinc sulphide concentration then being about 23% by weight of the slurry. To this slurry was added 1,186 parts by weight of octodecahydrated aluminum sulphate dissolved in about 4,000 parts by weight of water which represented an amount of aluminum equivalent to 1.5% Al(OH)$_3$ on the basis of the zinc sulphide. After thorough stirring to insure uniform mixing of the aluminum sulphate solution with the pigment, aqueous barium hydroxide solution was added to the slurry slowly with vigorous stirring of the slurry. Addition of barium hydroxide was continued until the slurry had a pH of from 7.0 to 7.2. The slurry was then filtered and the pigment dried at 170° C. and dry milled by passage through a rotary hammer mill. When incorporated in standard interior gloss paints and the paints spread on test panels and dried, it was found that after a period of approximately 6 months' exposure in a darkened room no tendency towards yellowing was exhibited. On the other hand, when a comparable test was made with a paint containing a similar but untreated pigment, yellowing became evident within one month and was very pronounced at the end of six months' time.

Example IV 60,720 parts by weight of a calcined, wet milled lithopone slurry containing 18,160 parts by weight of lithopone was diluted with sufficient water to permit efficient stirring, the lithopone concentration then being about 25% by weight of the slurry. To this slurry was added 1,186 parts by weight of octodecahydrated aluminum sulphate dissolved in about 4,000 parts by weight of water which represented an amount of aluminum equivalent to 1.5% Al(OH)$_3$ on the basis of lithopone. After thorough stirring to insure uniform mixing of the aluminum sulphate solution with the pigment, aqueous sodium hydroxide solution was added to the slurry slowly with vigorous stirring. Addition of sodium hydroxide was continued until the slurry had a pH of from 7.0 to 7.2. The slurry was then filtered and the pigment dried at 150° C. and dry milled by passage through a rotary hammer mill. When incorporated in conventional paint vehicles the paint films obtained therefrom exhibited an important and marked resistance to yellowing.

Example V 300 parts by weight of octodecahydrated aluminum sulphate was dissolved in approximately 5,000 parts by weight of water. Dilute ammonium hydroxide was then added slowly with good agitation until the slurry had a pH of from about 7.0 to 7.2. The precipitated hydrated aluminum oxide was washed by decantation and by filtering to remove soluble salts. The wet precipitate was then reslurried in sufficient water to give a total amount of about 5,000 parts by weight. One-half of this suspension was added to a water slurry of calcined lithopone containing 2,300 parts by weight of lithopone. The remaining half of the hydrated aluminum oxide suspension was added to a water slurry of calcined lithopone containing 500 parts by weight of lithopone. The former treated lithopone slurry comprising 1.5%, and the latter comprising 7%, Al(OH)$_3$ on the basis of the lithopone, were stirred to effect uniform distribution of the hydrated aluminum oxide and were filtered, dried at 150° C. and dry milled by passage through a squirrel cage disintegrator. Paint films prepared from these products exhibited a marked and superior resistance to yellowing as compared with prior art pigments.

While in Examples I and II, the treating agent is precipitated on the particles of zinc sulphide pigment in aqueous suspension by reaction of sodium aluminate and an acidifying agent, the use of other known types of soluble aluminates is also contemplated. Thus, all soluble salts of aluminic acid, and particularly the alkali metal salts thereof, because of their economic availability and effectiveness, or any soluble compound of a metal containing the radical AlO$_2^-$ or the radical AlO$_3^{---}$, may be used. Among other specific types of useful soluble aluminates may be mentioned potassium, lithium, strontium and barium aluminates. Again, while for most practical purposes, the soluble aluminates need only be employed individually, in some instances it may be desirable to employ mixtures of the same, and accordingly such use is contemplated as within the scope of the invention.

As stated, the aqueous solution of aluminate may be added to a normally acid or acidified suspension or slurry of previously calcined zinc sulphide pigment, and intimate mixture therebetween effected by efficient agitation through the media of mechanical stirrers or milling apparatus, such as a ball mill. If, as in Examples I and II, the pH of the mixed solutions is not within the desired range to effect precipitation, a suitable quantity of an acidifying agent, such as a mineral or organic acid or an acid salt having an acidic reaction, may be added to adjust the pH to the point desired for precipitation. Examples of suitable acidifying agents include sulphuric acid, hydrochloric acid, acetic acid, and such acidic salts as aluminum chloride or aluminum sulphate. The use of agents such as aluminum chloride or sulphate will be found particularly effective and preferable in the invention, because they afford precipitation of a maximum amount of hydrated aluminum oxide on the pigment without formation and introduction of objectionable soluble salts into the pigment.

Although, as exemplified in Examples III and IV, specific alkaline compounds have been employed to react with aluminum sulphate to precipitate the treating agent on the pigment, it will be obvious that other known alkaline compounds may be substituted for the barium hydroxide and sodium hydroxide there employed. Thus, in general, the alkali and alkaline earth metal compounds, including ammonium compounds, which react with aqueous solutions of aluminum sulphate to form hydrated aluminum oxide, are contemplated for use in the invention. Examples of such compounds include the oxides, hydroxides and carbonates of ammonium, sodium, potassium, calcium, strontium and barium, or mixtures of the same. Alkaline earth metal compounds, such as the barium and strontium hydroxides and carbonates which form insoluble sulphates, will be found particularly effective and preferable in the invention, since they afford precipitation of the hydrous aluminum oxide without formation of soluble salts.

In general, it will be found that pH values within the range of about 5 to 8 may be usefully employed in the invention during precipitations. Care is taken, however, to avoid adjusting the pH of the precipitating slurry to about 4.8 or lower, because within this latter range of acidity, zinc oxide present in the zinc sulphide may be completely dissolved and, as a result, the treated pigment will exhibit undesired properties, particularly with respect to durability characteristics. Preferably, the aluminum hydrate-treated zinc sulphide pigment obtained in the present invention will contain from about .15 to .35% of zinc oxide and not to exceed, say, about 1% thereof. Such amounts of zinc oxide are ordinarily introduced into the zinc sulphide pigment by reason of zinc sulphate decomposition during calcination. The zinc sulphate is present in the raw pigment as a result of normal processing. The presence of relatively small amounts of a slowly reactive compound, such as zinc oxide, in the zinc sulphide pigment is desirable. If the zinc sulphide contains no zinc oxide, it will be incapable of reacting with acids present in vehicles normally employed in coating formulations and formation of desirable soap compounds, essential to desired durability and non-chalking characteristics, will not result. It will thus be apparent that the present invention provides a novel type of zinc sulphide pigment which will contain not only requisite amounts of valuable hydrated aluminum oxide as a coating agent, but also desired amounts of slowly reactive zinc oxide, which will insure desired pigment durability, as well as a freedom from any tendency to yellow, and reduce any tendency to fade and chalk when the pigment is employed in coating formulations, especially those for application in exterior applications.

In Example V, wherein separately prepared, hydrated aluminum oxide is added to a slurry of calcined pigment, it will also be found preferable and desirable to effect precipitation and washing of the oxide in the cold, while maintaining the treating agent in moistened state previous to incorporation in the pigment. While the agent may be added to the pigment in relatively dry condition, it has been found that its effectiveness is somewhat diminished on drying. Similarly, it will also be found preferable to incorporate the agent in the pigment while in freshly precipitated condition.

Although the invention has been exemplified by adding or precipitating the hydrated aluminum oxide onto a zinc sulphide pigment, while maintained in aqueous slurry suspension, addition of the agent to a dry finished zinc sulphide pigment which has been slurried in water, or addition of the agent to the pigment at any convenient point after calcination during the processing of said pigment, is also contemplated. Usually the pigment is deflocculated and wet milled after calcination, and the treatment accorded by the present invention may be applied to this deflocculated material or to the flocculated pigment during or at any point in the finishing process.

While, as stated, precipitation of the hydrated aluminum oxide may be effected by acidification of a soluble aluminate, neutralization of aluminum sulphate and alum, or by adsorption from a solution of an aluminate, it has been found preferable in adapting the invention to precipitate the hydrous oxide by means of chemical reactions which avoid formation of water-soluble salts, such as sodium sulphate or the like, the introduction of which into the pigment would prove deleterious and adversely affect the durability qualities of paints and coating compositions in which the pigment may be employed. Because of the adsorptive nature of the pigment, soluble salts cannot be completely removed by washing or other known treatments, but if present in amounts up to substantially 0.25%, will not seriously impair the properties of the pigment. In the present invention, no soluble salts are introduced into the pigment as a result of treatment, but any which may be present arise by reason of normal processing and because of impurities employed in pigment production. Accordingly, in the preferred practice of the invention, the treated pigment will be substantially free of soluble salts, i. e., contain less than approximately 0.25% and will be of such character as to allow maximum film durability when incorporated in outside paints or coating compositions. Examples of reactions preferably employable for the purpose include those between barium aluminate and aluminum sulphate, and between aluminum sulphate and barium hydroxide, which result in the formation of no water-soluble salts as by-products.

While specific amounts of hydrated aluminum oxide have been indicated as utilizable in the foregoing examples, it will be obvious that suitable variance therefrom may be had without departing from the invention, and that the extent of pigment treatment afforded in each instance will vary with the type and previous history of the calcined zinc sulphide pigment and the properties required in the finished product. Thus, appreciable effects are obtained by additions of as little as about 0.03% of hydrated aluminum oxide, calculated as $Al(OH)_3$. Preferably, however, optimum benefits are obtained in the invention when from about substantially 0.3% to 2% of hydrated aluminum oxide are utilized. While such range is indicated as preferable, greater amounts may be employed, although for most practical purposes the range indicated will be found sufficiently effective.

While the invention has been described in its particular adaptation to the treatment of zinc sulphide and lithopone, the treatment of other types of zinc-containing pigments is also contemplated. Thus, not only are zinc sulphide and the calcium and barium base lithopone pigments contemplated for treatment, but pigments comprising zinc sulphide and commodities or mixtures of commodities, such as calcium sulphate, barium sulphate, titanium dioxide, silicates or metal titanates, particularly those of magnesium, barium, zinc, etc., may also be subjected to treatment.

The treated, improved pigments of the present invention will be found adaptable for beneficial use in well-known oil types of paints, enamels and lacquers of widely varying composition. They will be found particularly adaptable for use in coating compositions of the resin type, as well as in pyroxylin or other enamels and plastics containing cellulose derivatives, such as cellulose nitrate, cellulose acetate, etc., in which natural resins, softeners and plasticizers are present as essential ingredients.

I claim as my invention:

1. A process for producing a stabilized, previously calcined zinc sulphide pigment which is substantially free from soluble salts and contains from .15% to 1% of zinc oxide, comprising reacting in the presence of said calcined pigment a soluble aluminum salt with a soluble alkaline earth metal neutralizing agent, and maintaining the reaction mixture at a pH value ranging from about 5 to 8, whereby a small amount of hydrated aluminum oxide becomes associated intimately with said pigment and dissolution is avoided of the zinc oxide present therein.

2. A process for producing a stabilized, previously calcined zinc sulphide pigment which is substantially free from soluble salts and contains from .15% to 1% of zinc oxide, comprising reacting in the presence of said calcined pigment a soluble aluminum salt with an added, soluble alkaline earth metal neutralizing agent, and maintaining the reaction mixture at a pH value ranging from about 5 to 8, whereby from about .03% to 2%, based on the pigment, of hydrated aluminum oxide becomes intimately associated with said pigment and dissolution is avoided of the zinc oxide present therein.

3. A process for producing a stabilized, calcined zinc sulphide pigment which is substantially free from soluble salts and contains from about .15 to 1% of zinc oxide, which comprises reacting, in the presence of said pigment and subsequent to calcination thereof, a soluble aluminum salt with an added soluble alkaline earth metal neutralizing agent, maintaining the reaction mixture at a pH value ranging from above 4.8 to 8, whereby dissolution of the zinc oxide present in said pigment is avoided and hydrated aluminum oxide becomes intimately associated with said pigment.

4. A process for producing a stabilized, substantially soluble salt-free, calcined zinc sulphide pigment containing from about .15 to 1% of zinc oxide, which comprises reacting in the presence of an aqueous slurry of the previously calcined pigment a soluble aluminum salt with an added soluble alkaline earth metal neutralizing agent, maintaining the reaction mixture at a pH value of above 4.8 to 8, whereby dissolution of the zinc oxide present becomes avoided and a small amount of hydrated aluminum oxide becomes precipitated on said pigment, and thence subjecting the treated pigment to drying at a temperature below substantially 250° C.

5. A process for producing a stabilized, soluble, salt-free zinc sulphide pigment which comprises adding a soluble salt of aluminum to an aqueous suspension of a previously calcined zinc sulphide pigment, the zinc oxide content of which ranges from about .15 to 1%, and, through soluble alkaline earth metal neutralizing agent addition, maintaining the pH value of the resulting mixture within a range of about 5 to 8, whereby a small amount of hydrated aluminum oxide becomes precipitated on said pigment and dissolution of the zinc oxide content thereof is avoided.

6. A process for producing a durable, stabilized, calcined zinc sulphide pigment which is substantially free from soluble salts and contains from about .15% to .35% of zinc oxide, which comprises reacting, in the presence of said pigment and subsequent to its calcination, aluminum sulphate with barium aluminate, maintaining the pH value of the reaction mixture from above 4.8 to about 8, whereby dissolution of the zinc oxide present in said pigment is avoided and hydrated aluminum oxide in an amount ranging from substantially .3% to 2%, based on the zinc sulphide pigment, becomes intimately associated with said pigment.

7. A process for producing a durable, stabilized, calcined zinc sulphide pigment which is substantially free from soluble salts and contains from about .15% to .35% of zinc oxide, which comprises reacting, in the presence of said pigment and subsequent to its calcination, aluminum sulphate with barium hydroxide, maintaining the pH value of the reaction mixture from above 4.8 to about 8, whereby dissolution of the zinc oxide present in said pigment is avoided and hydrated aluminum oxide in an amount ranging from substantially .3% to 2%, based on the zinc sulphide pigment, becomes intimately associated with said pigment.

WILLIAM I. NOONBURG.